United States Patent
Chen et al.

(10) Patent No.: US 10,031,745 B2
(45) Date of Patent: Jul. 24, 2018

(54) SYSTEM AND METHOD FOR AUTOMATIC API CANDIDATE GENERATION

(71) Applicant: International Business Machines Corporation, Armonk, NY (US)

(72) Inventors: Hao Chen, Beijing (CN); Ya Bin Dang, Beijing (CN); Shao Chun Li, Beijing (CN); Guang Tai Liang, Beijing (CN); Li Jun Mei, Beijing (CN); Zhenyu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 15/013,207

(22) Filed: Feb. 2, 2016

(65) Prior Publication Data
US 2017/0220336 A1    Aug. 3, 2017

(51) Int. Cl.
*G06F 9/44*    (2018.01)
*G06F 8/70*    (2018.01)

(52) U.S. Cl.
CPC .................... *G06F 8/70* (2013.01)

(58) Field of Classification Search
CPC . G06F 8/70; G06F 8/65; G06F 9/4416; G06F 9/4843; H04L 41/082; H04L 67/34; H04L 67/125
USPC ......................................................... 717/106
See application file for complete search history.

(56) References Cited

U.S. PATENT DOCUMENTS

| | | | | |
|---|---|---|---|---|
| 6,219,827 B1* | 4/2001 | Man | ...................... | G06F 12/121 717/128 |
| 6,253,369 B1* | 6/2001 | Cloud | ..................... | G06F 9/546 717/136 |
| 6,651,243 B1* | 11/2003 | Berry | .................. | G06F 11/3419 717/130 |

(Continued)

FOREIGN PATENT DOCUMENTS

WO    2013/102200 A1    7/2013

OTHER PUBLICATIONS

Hess, "Aligning technology and business: Applying patterns for legacy transformation", 2005, IBM Systems Journal, vol. 44 No. 1.*

(Continued)

*Primary Examiner* — Wei Zhen
*Assistant Examiner* — Junchun Wu
(74) *Attorney, Agent, or Firm* — Scully, Scott, Murphy & Presser, P.C.; Keivan Razavi, Esq.

(57) ABSTRACT

Aspects of the present invention generally relate to a system, method, and computer program product for transforming APIs from legacy system-of-record to new system-of-engagement using complete API process logic. API candidates are generated from execution traces for transforming the API from the legacy system to a new system of record. An embodiment of the invention is first, add implementers into a legacy systems and collect the instrumenter output as execution traces. Second, rank the execution traces and find the most frequent execution traces. Third, consolidate the execution traces by merging common trace segments. The codes covered by the consolidated execution traces will be considered as candidate API components. Fourth, expand the merged execution traces and find related execution traces and check the connectivity between different nodes.

19 Claims, 9 Drawing Sheets

(56) References Cited

U.S. PATENT DOCUMENTS

| | | | |
|---|---|---|---|
| 6,662,362 B1* | 12/2003 | Arora | G06F 8/4441 |
| | | | 717/131 |
| 6,892,228 B1* | 5/2005 | Penders | G06F 17/30876 |
| | | | 717/109 |
| 7,720,872 B1 | 5/2010 | Biere et al. | |
| 7,836,042 B2 | 11/2010 | Liu | |
| 8,595,700 B2 | 11/2013 | Huang et al. | |
| 8,656,369 B2* | 2/2014 | Allen | G06F 11/3636 |
| | | | 717/132 |
| 8,843,890 B2 | 9/2014 | Frenkiel et al. | |
| 8,843,909 B2* | 9/2014 | Tondreau, Jr. | G06F 8/45 |
| | | | 717/103 |
| 8,881,139 B1 | 11/2014 | Acacio | |
| 2002/0087949 A1* | 7/2002 | Golender | G06F 9/547 |
| | | | 717/124 |
| 2003/0088854 A1* | 5/2003 | Wygodny | G06F 11/3636 |
| | | | 717/130 |
| 2003/0115025 A1 | 6/2003 | Lee et al. | |
| 2005/0138603 A1 | 6/2005 | Cha et al. | |
| 2005/0223392 A1 | 10/2005 | Cox et al. | |
| 2006/0026570 A1* | 2/2006 | Chan | G06F 8/316 |
| | | | 717/127 |
| 2009/0013307 A1* | 1/2009 | Raghavan | G06F 17/5009 |
| | | | 717/106 |
| 2009/0164980 A1* | 6/2009 | Rossmann | G06F 11/3495 |
| | | | 717/128 |
| 2010/0071028 A1 | 3/2010 | Brown et al. | |
| 2012/0297371 A1* | 11/2012 | Greifeneder | G06F 11/3495 |
| | | | 717/128 |
| 2013/0061212 A1* | 3/2013 | Krause | G06F 9/45516 |
| | | | 717/128 |
| 2013/0081001 A1* | 3/2013 | McColl | G06F 9/4443 |
| | | | 717/128 |
| 2013/0091285 A1 | 4/2013 | Devarkonda et al. | |
| 2013/0125097 A1* | 5/2013 | Ebcioglu | G06F 17/5045 |
| | | | 717/136 |
| 2015/0006318 A1 | 1/2015 | Thaker et al. | |
| 2016/0217058 A1* | 7/2016 | Kidron | G06F 9/543 |

OTHER PUBLICATIONS

Millard et al. "Design Patterns for Wrapping Similar Legacy Systems with Common Service Interfaces", 2006, IEEE.*

Stankovski et al. "Enabling Legacy Engineering Applications for Cloud computing: Experience with the mOSAIC API and Platform", 2012, IEEE.*

Acuna, "Understanding Legacy Workows through Runtime Trace Analysis", May 2015, Arizona State University.*

Ratanotayanon, S., Choi, H. J., and Sim, S. E.,"Using Transitive changesets to Support Feature Location", in Proceedings 25th IEEE/ACM International Conference on Automated Software Engineering (ASE'10), Antwerp, Belgium, Sep. 20-24, 2010, pp. 341-344.

Antoniol, G. and Guéhéneuc, Y., "Feature Identification: A Novel Approach and a Case Study", in Proceedings of 21st IEEE International Conference on Software Maintenance (ICSM'05), Budapest, Hungary, Sep. 25, pp. 357-366.

Antoniol, G. and Guéhéneuc, Y. G., "Feature Identification: An Epidemiological Metaphor", IEEE Transactions on Software Engineering, vol. 32, No. 9, 2006, pp. 627-641.

A. Kellens, K Mens, P. Tonella, "A Survey of Automated Code-Level Aspect Mining Techniques", Transactions on Aspect-Oriented Software Development IV, 2007, pp. 143-162.

N. Srinivasan, M. Paolucci, K. Sycara, "Semantic Web Service Discovery in the OWL-S IDE", Proceedings of the 39th Annual Hawaii International Conference on System Sciences (HICSS '06), 2006, pp. 109b.

* cited by examiner

Top Ranked Traces:
Trace 1: Start→$A_1$→$A_2$→$A_3$→$A_4$→$A_5$→$A_6$→End
Trace 2: Start→$A_1$→$A_2$→$A_3$→$A_4$→$A_5$→$A_7$→$A_8$→End

FIG. 4A       FIG. 4B       FIG. 4C

Top Ranked    Top Ranked    Low Ranked

Top Ranked Traces:
Trace 1: Start→$A_1$→$A_2$→$A_3$→$A_4$→$A_5$→$A_6$→End
Trace 2: Start→$A_1$→$A_2$→$A_3$→$A_4$→$A_5$→$A_7$→$A_8$→End

Low Ranked Traces:
Trace N: Start→$B_1$→$B_2$→$B_3$→$A_7$→$A_6$→$B_4$→End

SYSTEM AND METHOD FOR AUTOMATIC API CANDIDATE GENERATION

BACKGROUND

Aspects of the present invention generally relate to a system, method, and computer program product for transforming APIs from legacy system-of-record to new system-of-engagement using complete API process logic. Specifically, API candidates are generated from execution traces for transforming legacy APIs.

A legacy system is an old method, technology, computer system or application program of, relating to, or being a previous or outdated computer systems. For numerous reasons it is desirable to transform legacy systems to new systems. There is demand for transforming APIs from legacy systems-of record to "new" systems-of-engagement. Transformation using complete API process logic is preferable to feature location or relevant code identification.

SUMMARY

Aspects of the invention are a system, method, and computer readable program for transforming APIs from legacy systems-of-record to new systems-of-engagement.

An exemplary system for API candidate generation for transforming an API from a legacy system-of-record to a new system-of-engagement using API process logic comprises legacy system-of-record; instrumenters injected into the legacy system-of-record; application server for collecting output execution traces and variable-value pairs from the instrumenters; storage coupled to the application server for storing the collected output execution traces and the variable-value pairs; the application server further merging the output execution traces by merging common execution traces segments; extending the execution traces related to the merged execution traces; checking the connectivity of the execution traces between different nodes; and providing the checked execution traces between different nodes as an API candidate.

An exemplary method for API candidate generation for transforming an API from a legacy system-of-record to a new system-of-engagement using API process logic comprises injecting instrumenters into the API legacy system-of-record and collecting output execution traces and output variable-value pairs; merging the output execution traces by merging common execution traces segments; extending the execution traces related to the merged execution traces; checking the connectivity of the execution traces between different nodes; and providing the checked execution traces between different nodes as an API candidate.

An exemplary non-transitory computer readable medium having computer readable program for API candidate generation for transforming an API from a legacy system-of-record to a new system-of-engagement using API process logic comprises injecting instrumenters into the API legacy system-of-record and collecting output execution traces and output variable-value pairs; merging the output execution traces by merging common execution traces segments; extending the execution traces related to the merged execution traces; checking the connectivity of the execution traces between different nodes; and providing the checked execution traces between different nodes as an API candidate.

The objects, features, and advantages of the present disclosure will become more clearly apparent when the following description is taken in conjunction with the accompanying drawings.

DETAILED DESCRIPTION OF PREFERRED EMBODIMENTS

Aspects of the invention are related to transforming APIs from legacy systems-of-record to new systems-of engagement using complete API process logic.

Generally there are two major methods of API enablement. The first is a top-down method, discovering relevant components regarding the API requirements. The second is a bottom-up method, discovering API candidates from existing systems. The following embodiments are related to the bottom-up method.

Figure 1:
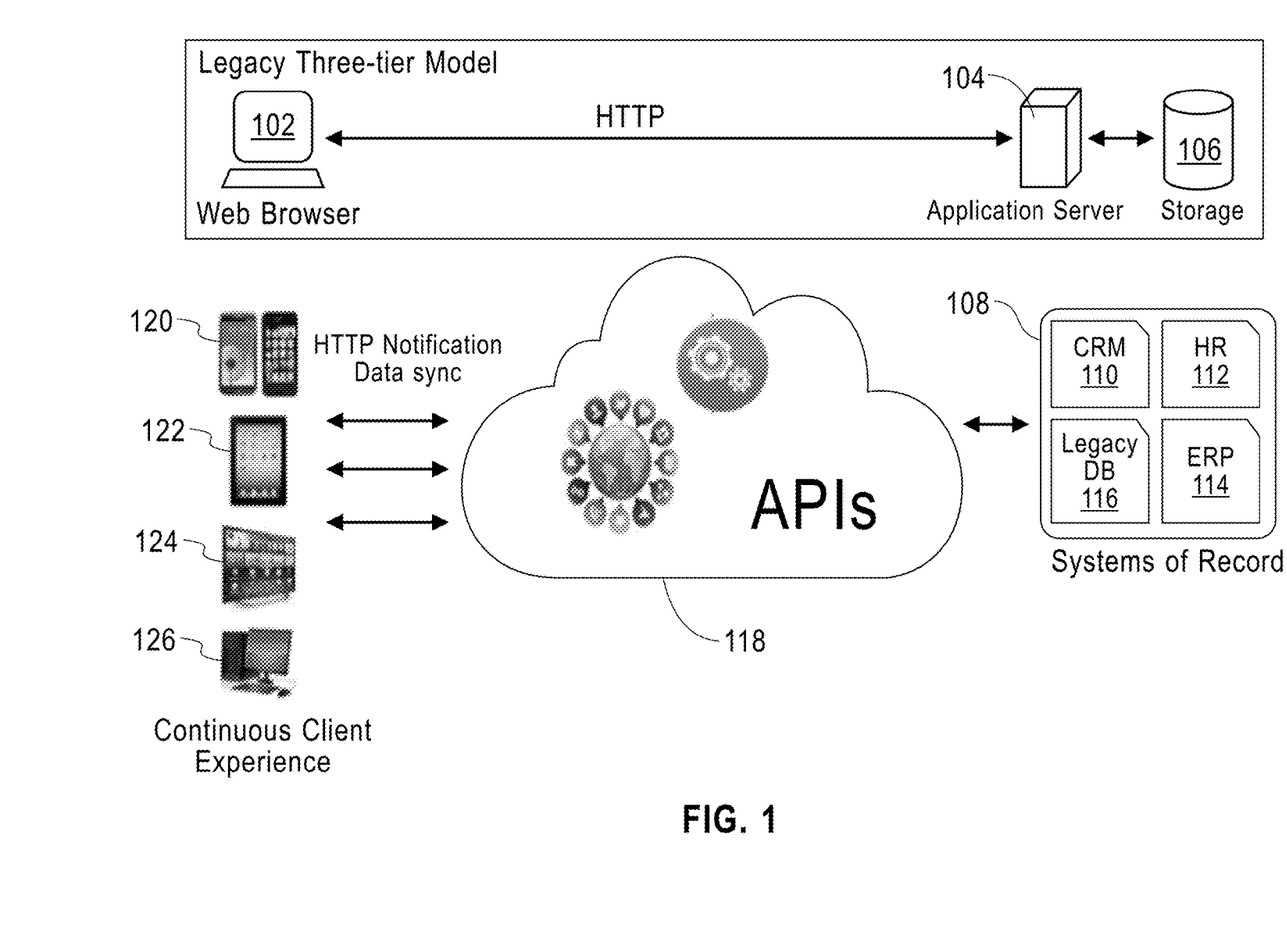
FIG. 1 illustrates an aspect of the invention for transforming APIs from legacy systems-of-record to new systems-of-engagement.

Mobile applications and APIs are bounded closely and enable companies to transform or enable applications between legacy systems and "new" systems. FIG. 1 schematically illustrates a Legacy Three-tier Model web browser 102 interacting with an application server 104 which, in turn, is connected to a storage device 106.

A legacy system-of-record 108 includes modules, such as CRM 110, HR 112, ERP 114, and Legacy DB 116. The legacy system interacts with APIs 118.

The API 118 uses HTTP Notification Data Sync to communicate with various mobile clients, such as 120, 122, 124, and 126. Aspects of the invention result in transformation of legacy APIs from a legacy 108 to the client devices.

Previous methods of discovering API candidates focus on finding patterns, for example, finding the most covered execution traces or most frequent invoked method sequences. However, such methods do not provide a candidate at the process level. Thus, API architects still need to manually check and remove many redundant candidates.

An aspect of the disclosure is using complete API process logic, rather than heretofore use of the feature location or relevant codes identification to generate an API candidate. An aspect of the invention is first, add implementers into a legacy system and collect the instrumenter output as execution traces. Second, rank the execution traces and find the most frequent execution traces. Third, consolidate the execution traces by merging common trace segments. The codes covered by the consolidated execution traces will be considered as candidate API components. Fourth, expand the merged execution traces and find related execution traces and check the connectivity between different nodes. The different steps are described in detail below.

An embodiment of an instrumenter is a code block injected into the original source code to collect test output (e.g., output the values of variables and do certain marking to collect code coverage). FIG. 3 is an example of Reference Implementation—Program Instrumentation. The code injection is performed on a computer or processing system. Details regarding implementation of a computer or processing system in providing aspects of the invention is shown and described in conjunction with FIG. 10.

The instrumenter can provide execution traces and variable-value pairs. Instead of checking every variable-value pairs, alternatively it is possible that the variable-value pairs are checked at selected nodes. For example, checking is performed every $10^{th}$ node along a path of a control-flow graph.

Another aspect of the invention is recommendation of a method and system for identifying well-defined API candidates. This is accomplished by providing a strategy to inject instrumenters into legacy systems, consolidating execution traces by merging common trace segments, and expanding to find the execution traces related to the merged execution traces, and automatically checking the connectivity between the different nodes.

Figure 2:
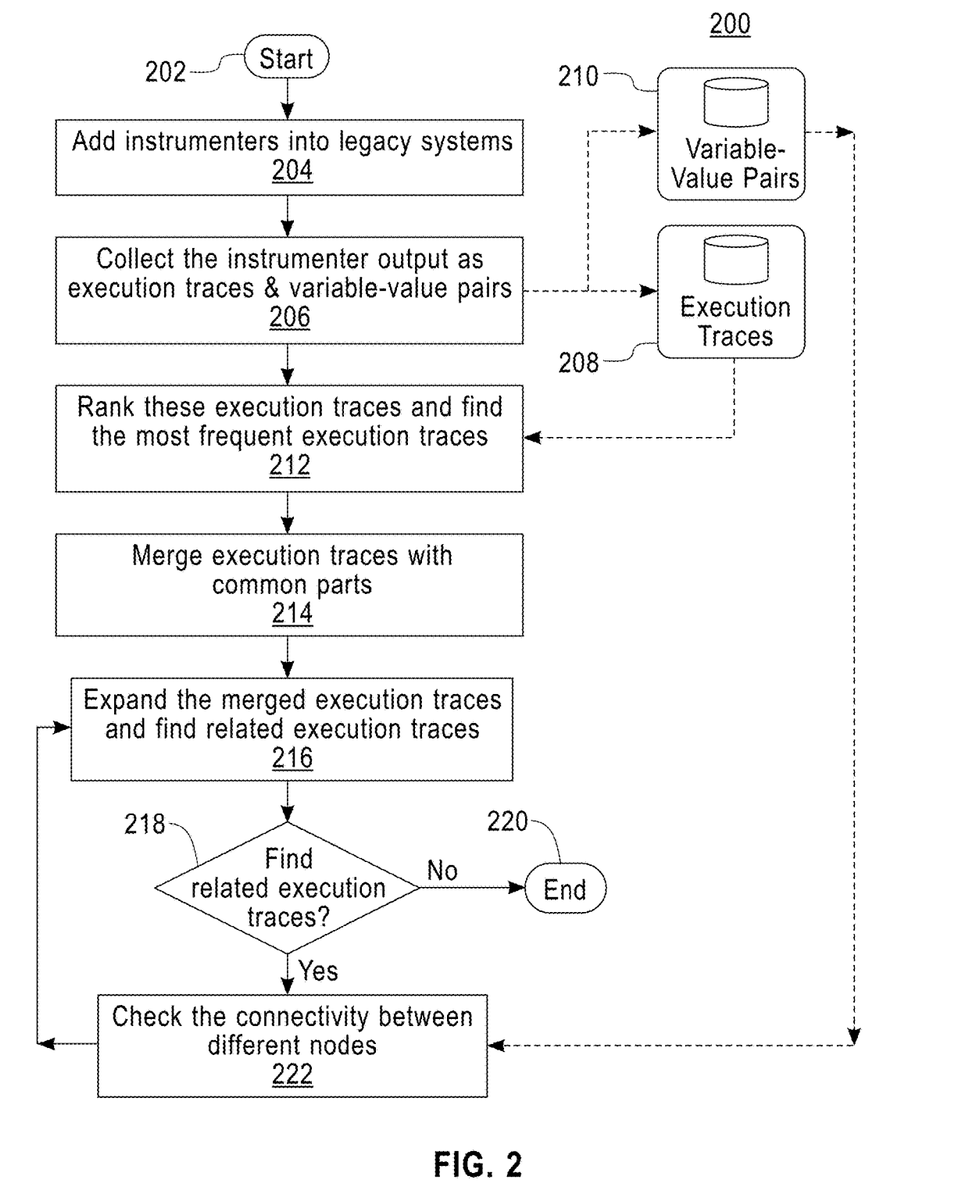
FIG. 2 is a system flow diagram of an embodiment of the invention.

FIG. 2 is a system diagram 200 illustrating various steps of an embodiment of the invention. The method starts 202 by adding instrumenters into legacy systems 204. Then, collecting instrumenter output as execution traces and variable-value pairs 206.

The execution traces are provided to a storage 208 while the variable-value pairs are provided to storage 210. Next, the storage 208 provides the execution traces for ranking and finding the most frequent execution traces 212.

There is a predetermined threshold level for determining high ranked and low ranked traces. The high ranked and low ranked traces only affect the percentage of covered code entry points, i.e., the start point of the code execution trace. It does not reduce the completeness of the API candidates. For example, if 30 percent is set as the high ranked traces, all entry points are collected and ranked and the top 30 percent of the entry points are selected as top ranked traces.

Next, execution traces with common parts or components are merged 214. Then, extending the merged execution traces and finding related execution traces 216.

A decision is made whether there is a finding of related execution traces 218. If the decision is that there are no related execution traces, the process ends 220. If the decision is that there are more related execution traces, check the connectivity between different nodes 222 using the variable-value pairs from storage 210. The results of the checking the connectivity between different nodes are provided to step 216 for extending the execution traces to find related execution traces. The method continues until no further related execution traces are found at step 218, after which the method ends 220.

Figure 3A:
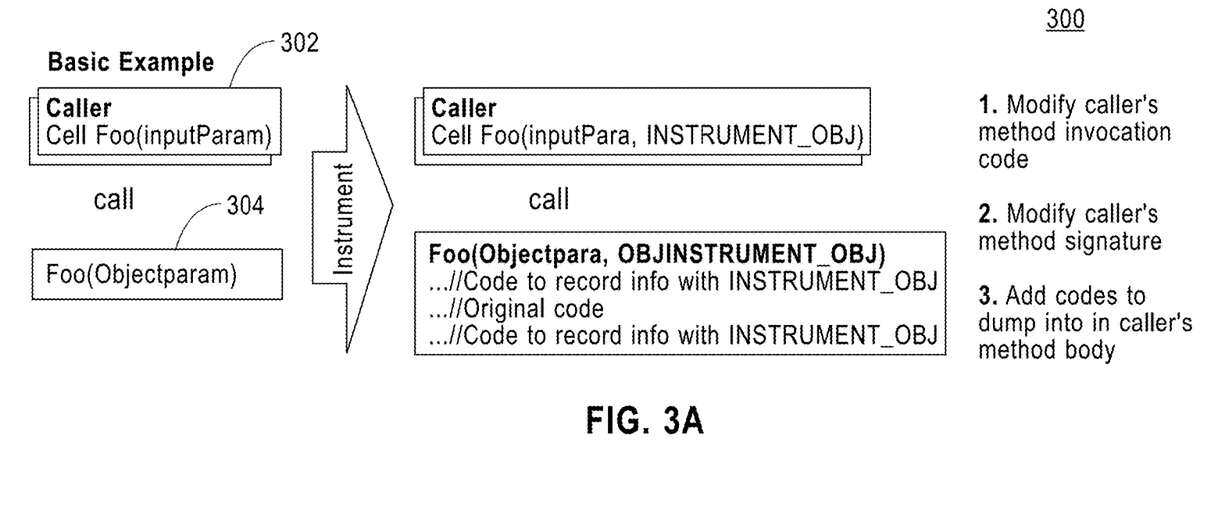
FIG. 3A shows a basic example of reference implementation to program instrumentation.

FIG. 3A shows a basic example of reference implementation for finding execution traces 300. Modify the caller's method invocation code 302. Modify the callee's method signature 304. Then, adding the modified codes to dump into callee's method body.

Figure 3B:
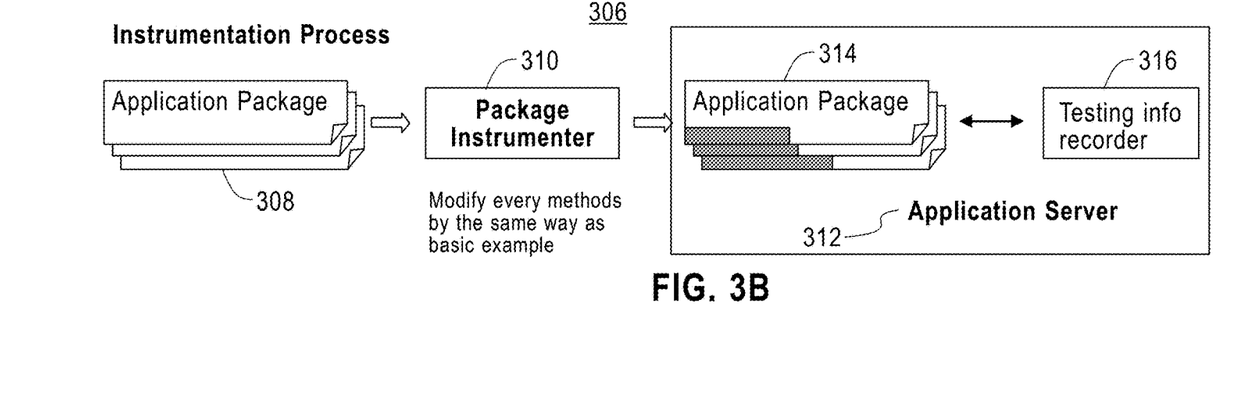
FIG. 3B shows an implementation embodiment for practicing the embodiment of FIG. 3A.

FIG. 3B shows an instrumentation process embodiment 306 for use in the practicing the embodiment in FIG. 3A. The process starts with an application package 308. A package instrumenter 310 is added to the code to modify every method the same way as the basic example in FIG. 3A. In Application Server 312, modified application package 314 undergoes testing info recorder 316.

Figures 4A, 4B:
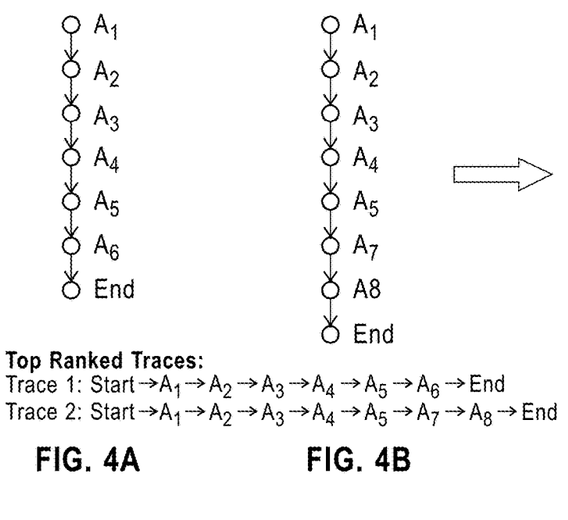
FIGS. 4A and 4B show top ranked traces of control-flow graphs.
Figure 4C:
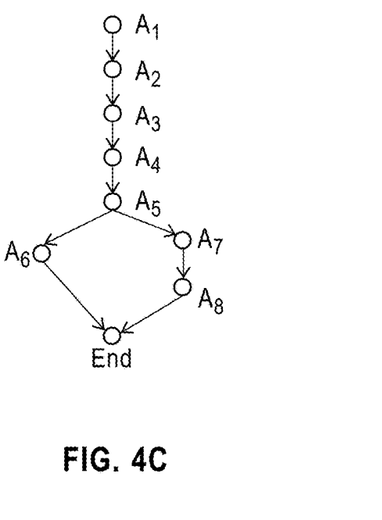
FIG. 4C shows a control-flow graph resulting from merging the top ranked paths in FIGS. 4A and 4B.

FIG. 4A and FIG. 4B show typical top ranked traces and FIG. 4C shows a graphical representation of the merging of the traces in FIG. 4A and FIG. 4B. Top ranked trace in FIG. 4A is a sequence $A_1 \rightarrow A_2 \rightarrow A_3 \rightarrow A_4 \rightarrow A_5 \rightarrow A_6 \rightarrow$End. Top ranked trace in FIG. 4B is a sequence $A_1 \rightarrow A_2 \rightarrow A_3 \rightarrow A_4 \rightarrow A_5 \rightarrow A_7 \rightarrow A_8 \rightarrow$End. When both of the traces in FIG. 4A and FIG. 4B are merged, the result is the control-flow graph in FIG. 4C.

Figure 5A:
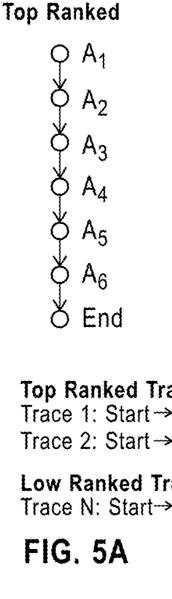
FIGS. 5A and 5B are top ranked traces from a control-flow path.
Figure 5B:
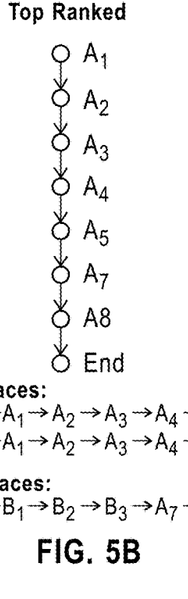
Figures 5C, 5D:
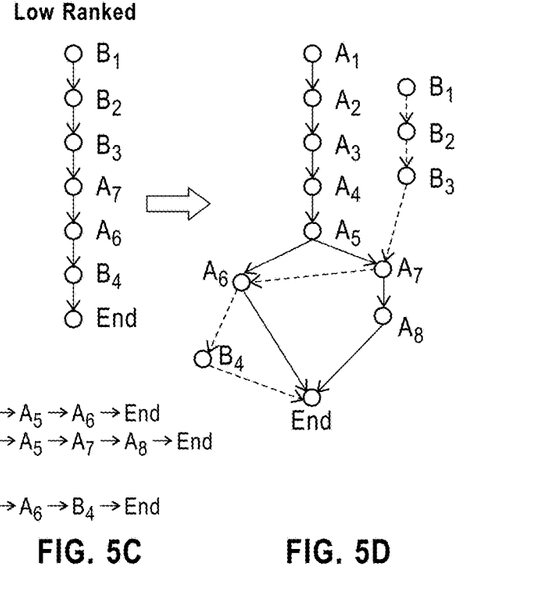
FIG. 5C is a low ranked trace from a control-flow path.
FIG. 5D is a control-flow graph of the merger of the traces in FIGS. 5A, 5B, and 5C.

There is shown an extension of the traces to include an additional low ranked trace in FIG. 5C and the result when the traces are extended is the control-flow graph shown in FIG. 5D. Top ranked trace in FIG. 5A is a sequence $A_1 \rightarrow A_2 \rightarrow A_3 \rightarrow A_4 \rightarrow A_5 \rightarrow A_6 \rightarrow$End. The top ranked trace in FIG. 4B is a sequence $A_1 \rightarrow A_2 \rightarrow A_3 \rightarrow A_4 \rightarrow A_5 \rightarrow A_7 \rightarrow A_8 \rightarrow$End. The low ranked trace in FIG. 5C is a sequence $B_1 \rightarrow B_2 \rightarrow B_3 \rightarrow A_7 \rightarrow A_6 \rightarrow B_4 \rightarrow$End. FIG. 5D is a graphical representation of the control-flow graph extending the top ranked traces in FIG. 5A and FIG. 5B with the low ranked trace in FIG. 5C. The solid line shows the top ranked trace paths and the dashed line shows the low ranked trace path with additional nodes and minimal common nodes.

Figure 6A:
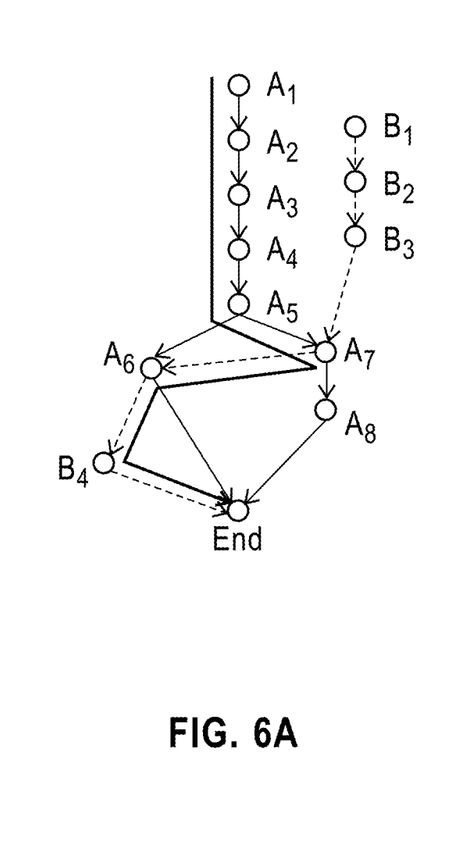
FIG. 6A is a control-flow graph including a low ranked trace as shown in FIG. 5D.
Figure 6B:
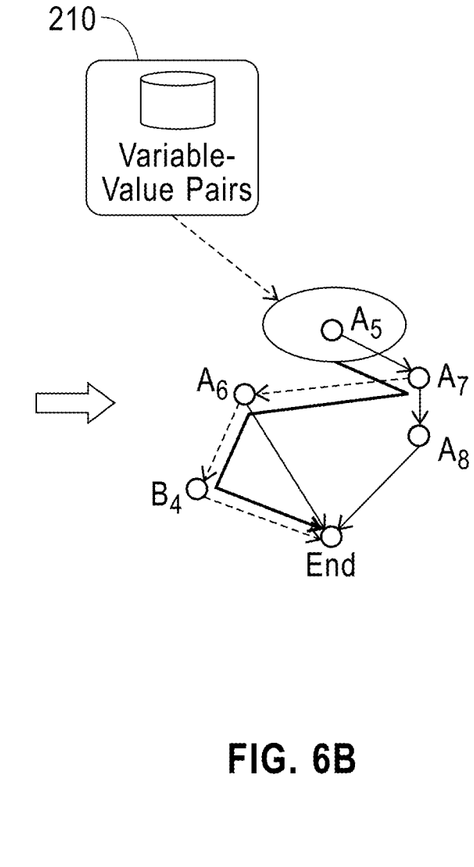
FIG. 6B shows a trace extended by checking the connectivity of the nodes.

FIG. 6A shows the graphical control-flow graph representation of the graph in FIG. 5D is extended with the addition of a low ranked trace path $A_1 \rightarrow A_2 \rightarrow A_3 \rightarrow A_4 \rightarrow A_5 \rightarrow A_7 \rightarrow A_6 \rightarrow B_4 \rightarrow$End. The nodes are checked with the variable-value pairs in database 210 and the graph is reduced to that shown in FIG. 6B. Namely, path $A_5 \rightarrow A_7 \rightarrow A_6 \rightarrow B_4 \rightarrow$End. Low ranked traces are not discarded and will be added depending on their feasible relations with the high ranked traces. An aspect of the invention is the provision of a method to automatically examine the path feasibility after merging high ranked and low ranked traces and removing indefeasible code paths to reduce human examination efforts. The result of checking the connectivity between different nodes 222 undergoes symbolic execution 602 where infeasible paths, low ranked traces, are removed 604 and feasible paths are extended with overlapped and onward traces 606.

Figure 7:
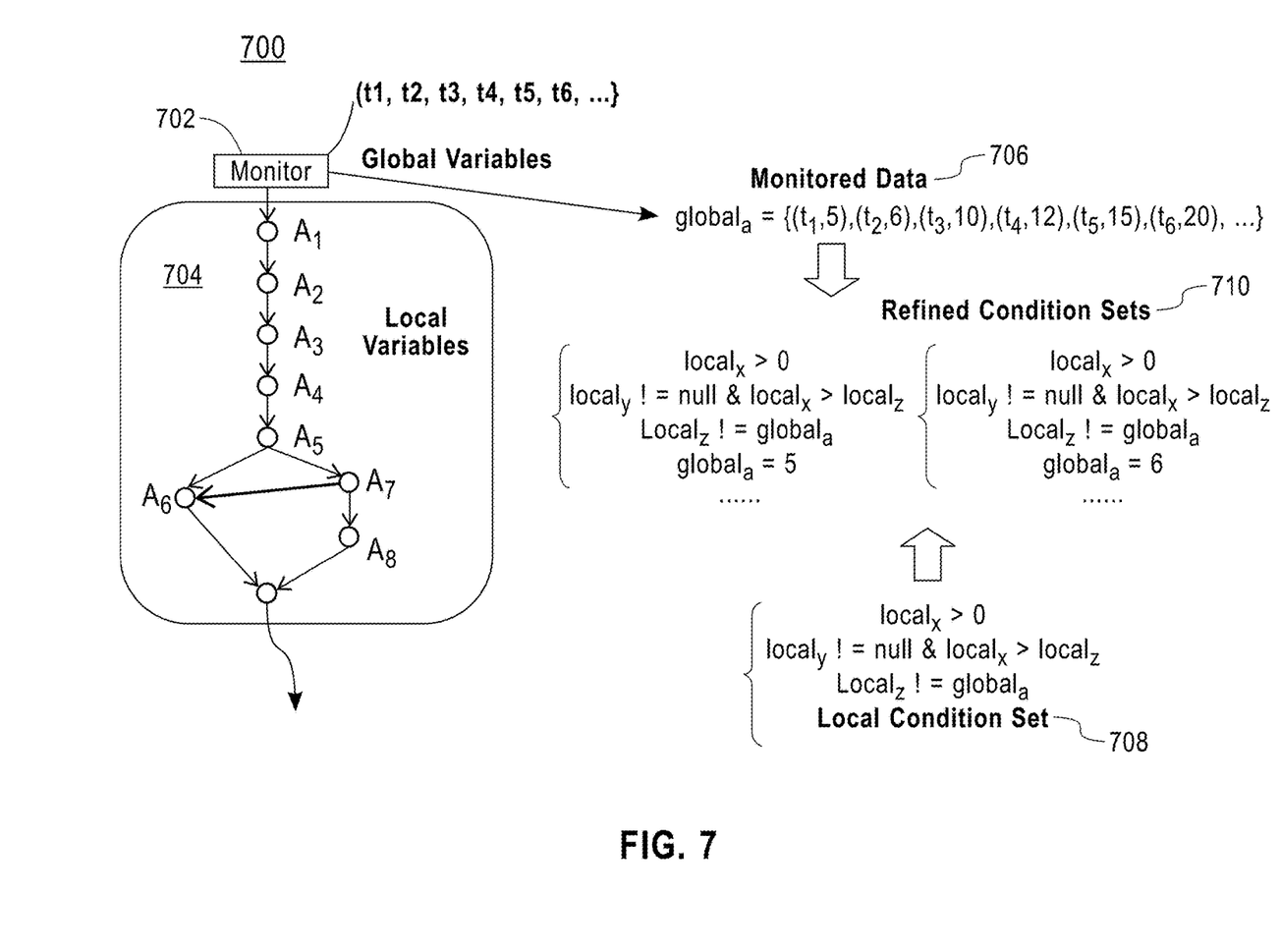
FIG. 7 shows an aspect of the invention for refining condition sets.

FIG. 7 shows an aspect of the invention for refining condition sets 700. Global variables {t1, t2, t3, t4, t5, t6, . . . } are monitored 702. The output of monitor 702 is combined with local variables 704 using the merged top ranked traces configuration in FIG. 4C. The global monitored data 706, is global$_a$={($t_1$, 5), ($t_2$, 6), ($t_3$, 10), ($t_4$, 12), ($t_5$, 15), ($t_6$, 20), . . . }. The local condition set 708 from 704 is, local$_x$>0; local$_y$!=null & local$_x$>local$_z$; local$_z$!=global$_a$. The global monitored data 706 and the local condition set 708 are combined to form refined condition sets 710.

Figure 8:
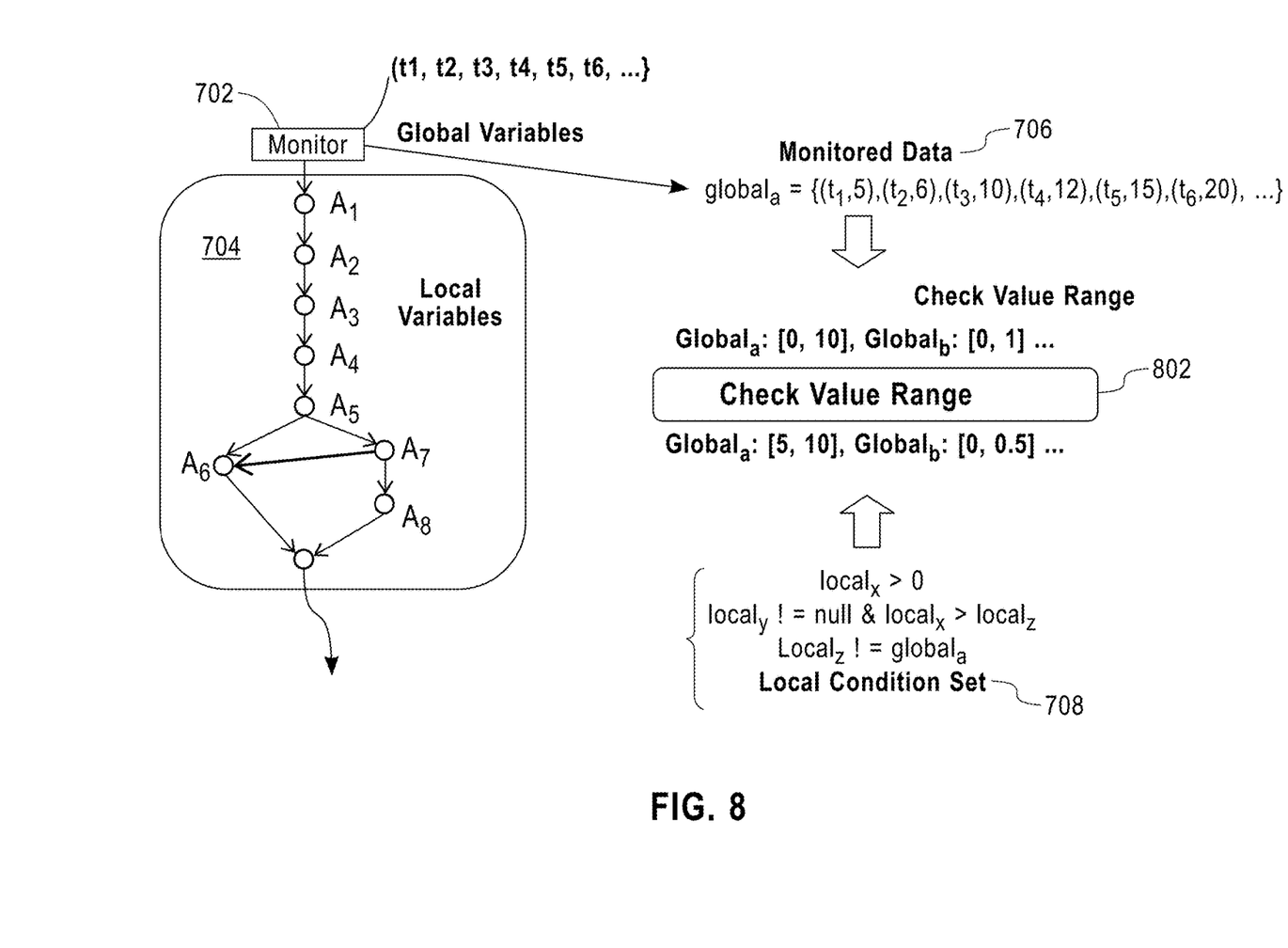
FIG. 8 shows an aspect of the invention where monitored data and local condition sets are subject to checking value range.

In FIG. 8, instead of forming refined condition sets 710, the global monitored data 706 and the local condition set 708 are subject to a check value range 802. The global monitored data value range is Global$_a$: [0, 10], Global$_b$: [0, 1], . . . . The local condition set value range is Global$_a$: [5, 10], Global$_b$:

[0, 0.5], . . . . The global monitored data and the local condition set are subject to a value range check.

Figure 6C:
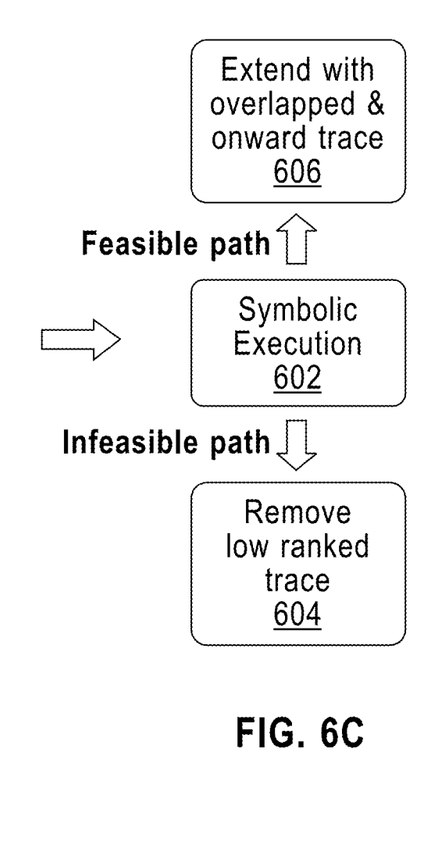
FIG. 6C shows the application of process logic.
Figure 9:
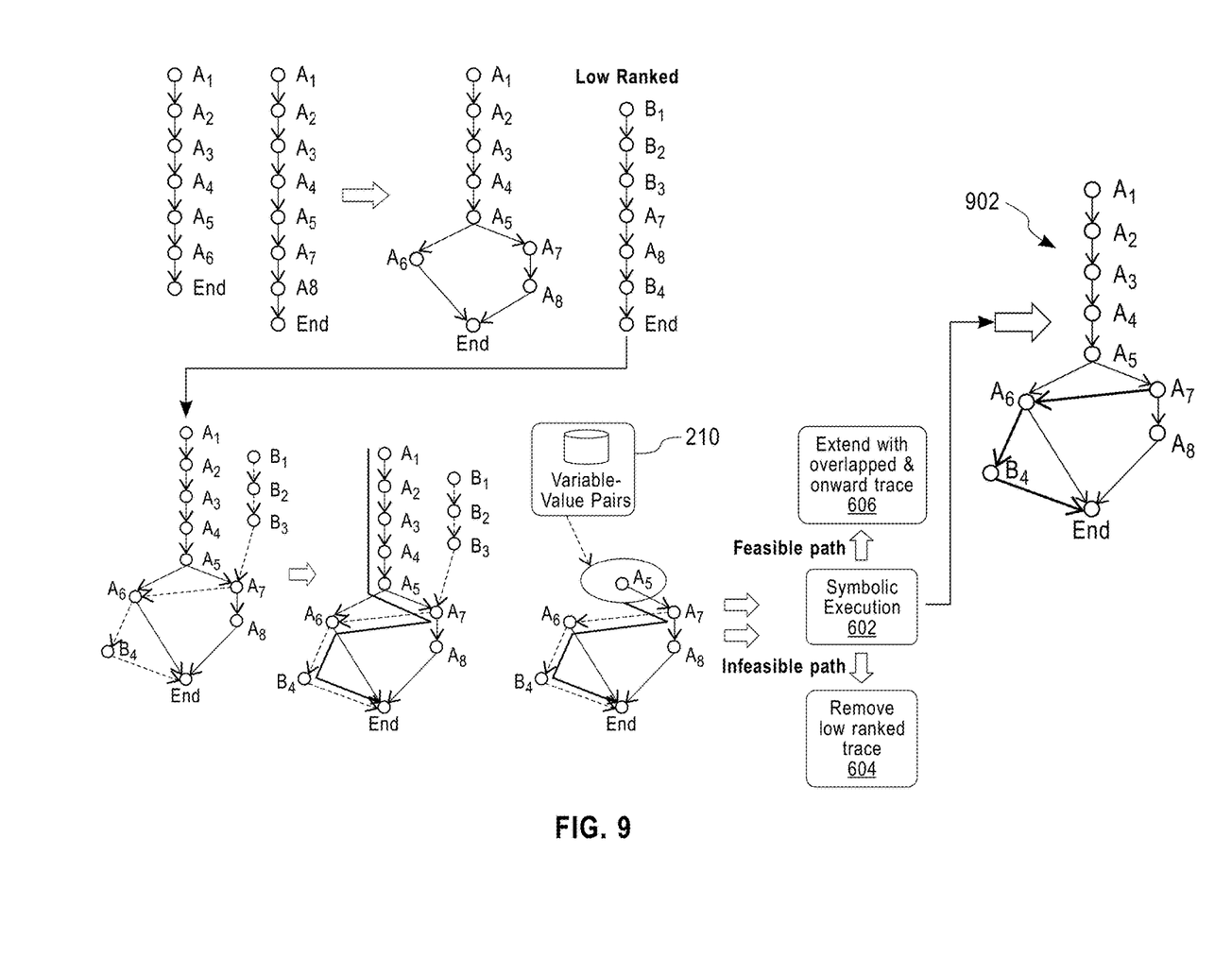
FIG. 9 combines the traces, steps, and control-flow paths in FIGS. 4-6 generating a final API candidate.

FIG. 9 combines the traces, steps, and control-flow graphs shown in FIGS. 4-6 and results in a final generated API candidate 902 for transforming legacy APIs from legacy systems-of-record to new systems-of-engagement using complete API process logic.

The heretofore processes of finding patterns, e.g., finding the most covered exception traces or most frequent invoked method sequences, are not used in finding a API candidate.

Figure 10:
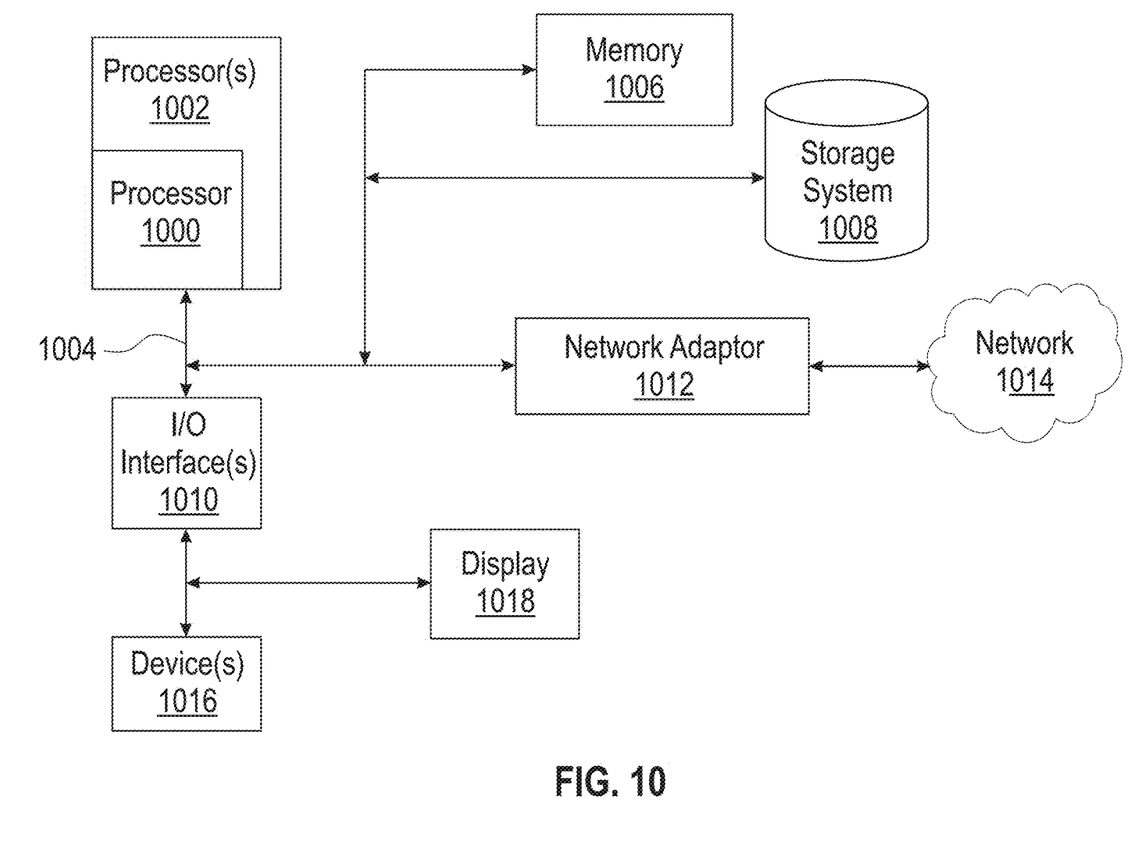
FIG. 10 is a schematic block diagram of a computer system for practicing various aspects and embodiments of the invention.

FIG. 10 illustrates a schematic diagram of an example computer or processing system that may implement the generation of a final API candidate for transforming an API from a legacy system-of-record to a new system-of-engagement. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 1002, a system memory 1006, and a bus 1004 that couples various system components including system memory 1006 to processor 1002. The processor 1002 may include a module 1000 that performs the methods described herein. The module 1000 may be programmed into the integrated circuits of the processor 1002, or loaded from memory 1006, storage device 1008, or network 1014 or combinations thereof.

Bus 1004 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 1006 can include computer system readable media in the form of volatile memory, such as random access memory (RAM) and/or cache memory or others. Computer system may further include other removable/non-removable, volatile/non-volatile computer system storage media. By way of example only, storage system 1008 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1004 by one or more data media interfaces.

Computer system may also communicate with one or more external devices 1016 such as a keyboard, a pointing device, a display 1018, etc.; one or more devices that enable a user to interact with computer system; and/or any devices (e.g., network card, modem, etc.) that enable computer system to communicate with one or more other computing devices. Such communication can occur via Input/Output (I/O) interfaces 1010.

Still yet, computer system can communicate with one or more networks 1014 such as a local area network (LAN), a general wide area network (WAN), and/or a public network (e.g., the Internet) via network adapter 1012. As depicted, network adapter 1012 communicates with the other components of computer system via bus 1004. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for Application Programming Interface (API) candidate generation for transforming an API from a legacy system-of-record-to a new system-of-engagement using API process logic comprising:
injecting code blocks into API legacy system-of-record;
collecting test outputs generated by the legacy system-of-record with the injected code blocks, wherein the test outputs includes one or more output execution traces and one or more variable-value pairs, and wherein each execution trace corresponds to a respective trace path including one or more nodes;

merging the output execution traces by merging common execution trace segments among the output execution traces;

extending the merged execution traces using an execution trace among the output execution traces that includes a node connected to at least one node among the merged execution traces;

checking the connectivity between the nodes of the extended merged execution traces with nodes of unmerged execution traces among the output execution traces using the variable-value pairs;

providing the checked execution traces as an API candidate; and transforming the API from the legacy system-of-record-to the new system-of-engagement using the API candidate.

2. The method as set forth in claim 1, where the collected output execution traces are stored in a first memory storage device.

3. The method as set forth in claim 2, further comprising ranking the stored collected execution traces from the first memory storage device.

4. The method of claim 3, wherein the merging comprises merging a plurality of top ranked traces.

5. The method of claim 3, wherein the extending comprises adding a low ranked trace.

6. The method as set forth in claim 1, further comprising storing the variable-value pairs in a second memory storage device.

7. The method as set forth in claim 6, wherein the checking comprises retrieving variable-value pairs from the second memory storage device.

8. A computer-implemented system for Application Programming Interface (API) candidate generation for transforming an API from a legacy system-of-record to a new system-of-engagement using API process logic comprising:

A legacy system-of-record including a legacy application server and a storage device;

a plurality of instrumenters configured to inject a plurality of code blocks into the legacy database application server;

the application server configured to collect test outputs including one or more execution traces and one or more variable-value pairs from the instrumenters, wherein each execution trace corresponds to a respective trace path including one or more nodes;

a first memory storage device coupled to the application server for storing the collected output execution traces;

a second memory storage device coupled to the application server for storing the variable-value pairs;

wherein the application server includes a processor configured to:

merge the output execution traces by merging common execution trace segments among the output execution traces;

extend the merged execution traces with use of an execution trace among the output execution traces that includes a node connected to at least one node among the merged execution traces;

check the connectivity between the nodes of the extended merged extended execution traces with nodes of unmerged execution traces among the output execution traces with use of using the variable-value pairs from the second memory storage device;

provide the checked execution traces as an API candidate; and transform the API from the legacy system-of-record-to the new system-of-engagement using the API candidate.

9. The computer-implemented system as set forth in claim 8, wherein the processor is further configured to rank the stored collected execution traces from the first memory storage device.

10. The computer-implemented system as set forth in claim 9, wherein the processor is further configured to merge top ranked execution traces.

11. The computer-implemented system as set forth in claim 9, wherein the processor is further configured to add a low ranked trace to extend the merged execution traces.

12. The computer-implemented system as set forth in claim 8, wherein the processor is further configured to retrieve variable-value pairs from the second memory storage device to check the connectivity of the execution traces.

13. A non-transitory computer readable medium having computer readable program for Application Programming Interface (API) candidate generation for transforming an API from a legacy system-of-record to a new system-of-engagement using API process logic comprising:

injecting code blocks into the API legacy system-of-record;

collecting test outputs generated by the legacy system-of-record with the injected code blocks, wherein the test outputs includes one or more execution traces and one or more variable-value pairs, and wherein each execution trace corresponds to a respective trace path including one or more nodes;

merging the output execution traces by merging common execution trace segments among the output execution traces;

extending the merged execution traces using an execution trace among the output execution traces that includes a node connected to at least one node among the merged execution traces;

checking the connectivity between the nodes of the extended merged execution traces with nodes of unmerged execution traces among the output execution traces using variable-value pairs;

providing the checked execution traces as an API candidate; and transforming the API from the legacy system-of-record-to the new system-of-engagement using the API candidate.

14. The non-transitory computer readable medium as set forth in claim 13, where the collected output execution traces are stored in a first memory storage device.

15. The non-transitory computer readable medium as set forth in claim 14, further comprising ranking the stored collected execution traces from the first memory storage device.

16. The non-transitory computer readable medium as set forth in claim 15, wherein the merging comprises merging a plurality of top ranked traces.

17. The non-transitory computer readable medium as set forth in claim 15, wherein the extending comprises adding a low ranked trace.

18. The non-transitory computer readable medium as set forth in claim 13, further comprising storing the variable-value pairs in a second memory storage device.

19. The non-transitory computer readable medium as set forth in claim 18, wherein the checking comprises retrieving variable-value pairs from the second memory storage device.

\* \* \* \* \*